United States Patent [19]
Kela

[11] Patent Number: 5,917,907
[45] Date of Patent: Jun. 29, 1999

[54] TELEPHONE HOLDER WITH LOCKING BRACKET HAVING A RETARDING SPRING

[75] Inventor: Jukka Kela, Salo, Finland

[73] Assignee: Nokia Mobile Phones Limited, Espoo, Finland

[21] Appl. No.: 08/789,432

[22] Filed: Jan. 29, 1997

[30] Foreign Application Priority Data

Jan. 31, 1996 [FI] Finland ..................................... 960450

[51] Int. Cl.⁶ .................................................... H04M 1/00
[52] U.S. Cl. ............................................ 379/446; 379/455
[58] Field of Search ..................................... 379/446, 455, 379/454, 435, 428, 436

[56] References Cited

U.S. PATENT DOCUMENTS

| | | | |
|---|---|---|---|
| 4,741,033 | 4/1988 | Utoh et al. .............................. | 379/435 |
| 4,741,034 | 4/1988 | Errichiello et al. ...................... | 379/455 |
| 4,957,264 | 9/1990 | Hakanen ................................ | 248/510 |
| 4,969,187 | 11/1990 | Hattori et al. ........................... | 379/433 |
| 5,016,851 | 5/1991 | Koskinen et al. ....................... | 248/278 |
| 5,040,712 | 8/1991 | Pesonen et al. ..................... | 224/42.45 |
| 5,121,863 | 6/1992 | Kotitalo et al. ...................... | 224/42.45 |
| 5,189,698 | 2/1993 | Hakanen ................................ | 379/455 |
| 5,597,102 | 1/1997 | Saarikko et al. ........................ | 224/197 |
| 5,652,792 | 7/1997 | Gallagher et al. ...................... | 379/446 |

FOREIGN PATENT DOCUMENTS

| | | |
|---|---|---|
| 0590450 A1 | 4/1994 | European Pat. Off. . |
| 89650 | 6/1993 | Finland . |
| 3542424 A1 | 6/1987 | Germany . |
| 675336A5 | 9/1990 | Switzerland . |

*Primary Examiner*—Jack Chiang
*Attorney, Agent, or Firm*—Perman & Green, LLP

[57] ABSTRACT

The invention is related to the bracket for an electronic appliance such as a mobile phone. The bracket comprises a locking and a releasing means which can be used to attach the appliance to and release it from the bracket. The releasing means is provided with a groove (9), the groove comprising a releasing member (20) that moves by the power of a spring when the appliance is detached, and a retarding spring (22) which can be used to press the releasing member against the groove to slow down the movement of the releasing member. In this way, the device will not come loose from the bracket by a sudden jolt. The bracket can be used, for instance, to attach the mobile phone to the dash board of a car. The appliance remains firmly in the bracket when the car is moving and it is easy and safe to detach.

11 Claims, 5 Drawing Sheets

TELEPHONE HOLDER WITH LOCKING BRACKET HAVING A RETARDING SPRING

TECHNICAL FIELD

The invention is generally related to electronic devices such as mobile phones, and particularly to a bracket comprising a fixing means for holding the device in the bracket. The invention can be used, e.g., in fixing a mobile phone to the dash board of a car.

TECHNICAL BACKGROUND

A bracket is often used with mobile phones to place the mobile phone in. The bracket can be attached to the dash board of a car, for example. The device generally comprises some type of locking means for holding the mobile phone in place when the car is moving.

For it to be possible to place different mobile phones in the same bracket, the mobile phones should have the same shape, which restricts the design. Alternatively, a different bracket should be made for each model, increasing the cost.

FI-patent no. 89650 (to Nokia Mobile Phones Ltd.), for example, discloses a bracket for mobile phones which comprises different models for different shape mobile phones. The bracket comprises fixing members which apply pressure on the mobile phone at the sides.

DESCRIPTION OF THE INVENTION

GENERAL DESCRIPTION

A bracket according to claim 1 has now been invented. Preferred applications of the invention are described in the other claims.

The bracket according to the invention is provided with a locking and a releasing means which can be used to attach the appliance to the bracket and release it. The releasing means is provided with a groove. The groove is provided with a releasing member which is moved by the power of a spring when the appliance is detached, and a retarding spring which can be used to press the releasing member against the groove to slow down the movement of the releasing member. The groove may be in the form of a smooth surface, a recession or a notch in which the releasing member is moved.

Because of the retarding spring, the releasing member moves in a retarded and smooth manner so that the device is not disengaged from the bracket by a sudden jolt.

The retarding spring can be a helical spring which can be used to press the releasing member or to draw it in a lateral direction. The releasing member can be hollow and resilient so that the retarding spring can be placed inside the releasing member, pressing outwardly on its walls. The resilient walls of the releasing member or those of the groove (which is in the form of a sleeve, for instance) which have a suitable shape can also serve as the retarding spring.

The power of the retarding spring remains constant for an extended period, and its behaviour is well known. Consequently, the structure is reliable and durable.

BRIEF DESCRIPTION OF THE DRAWINGS

The appended drawings are part of the special description of the invention. In the drawings.

DETAILED DESCRIPTION

Figure 1:
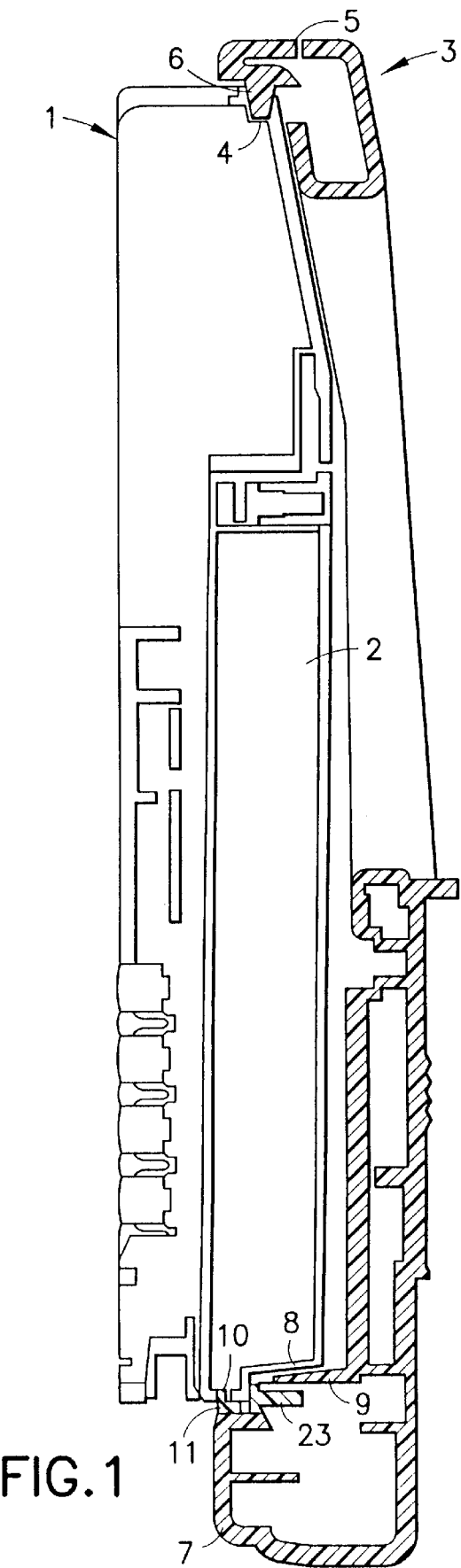
FIG. 1 is a side view of a bracket and a mobile phone placed in it.
Figure 2:
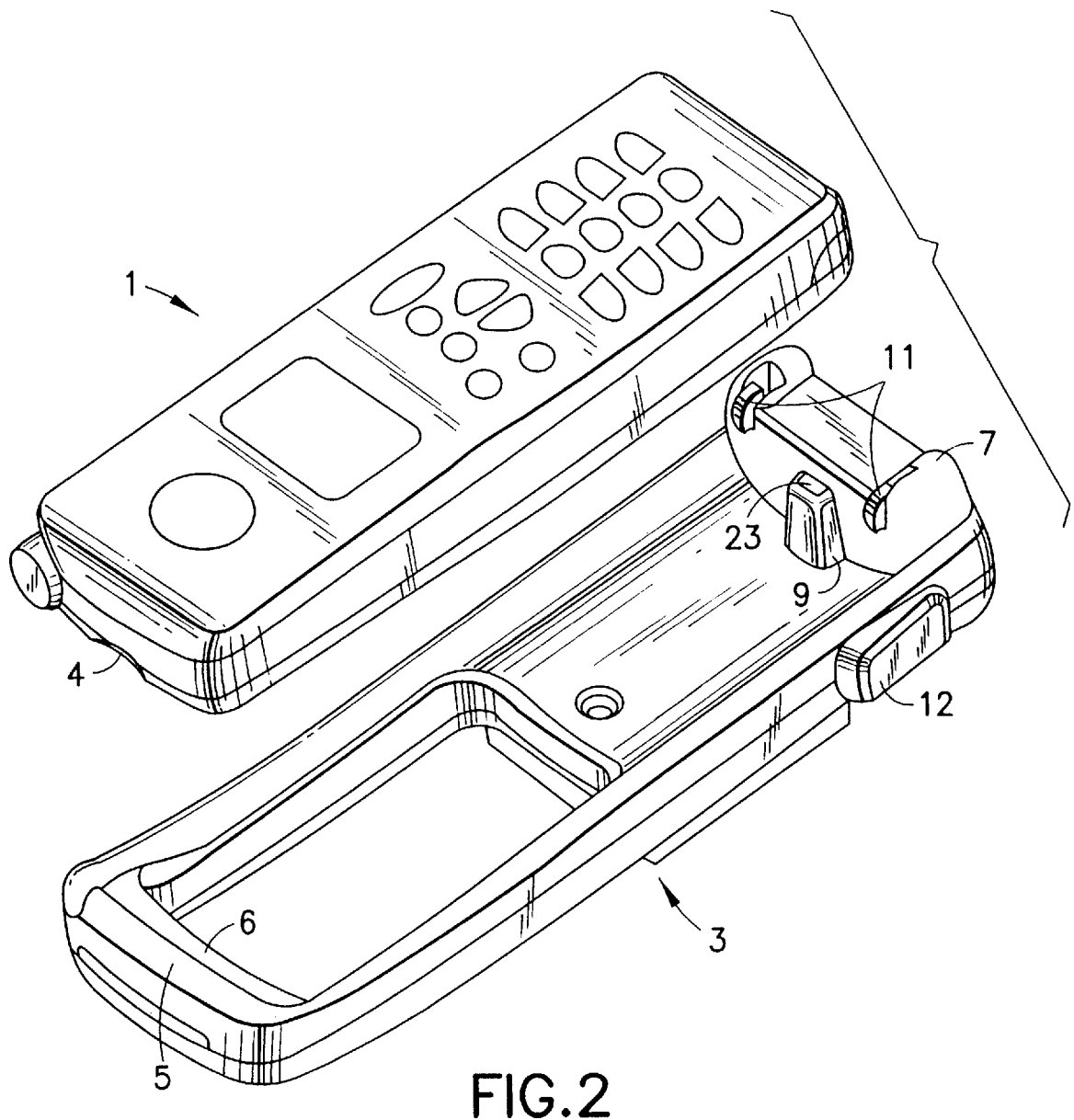
FIG. 2 is a top view of the bracket and the mobile phone that is to be placed in it, taken obliquely from the end thereof.
Figure 3:
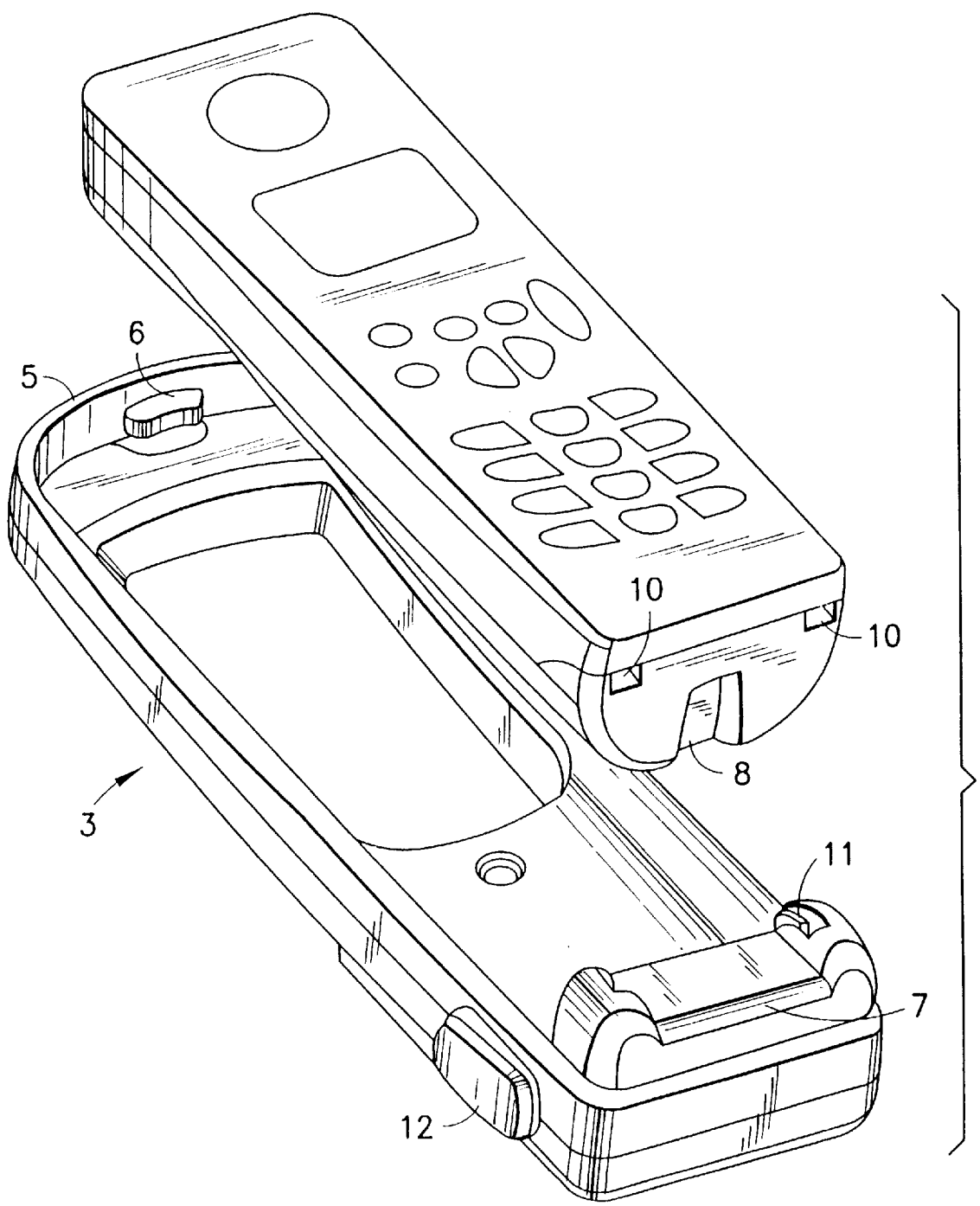
FIG. 3 is a bottom view of the bracket and the mobile phone that is to be placed in it, taken obliquely from the end thereof.
Figure 4:
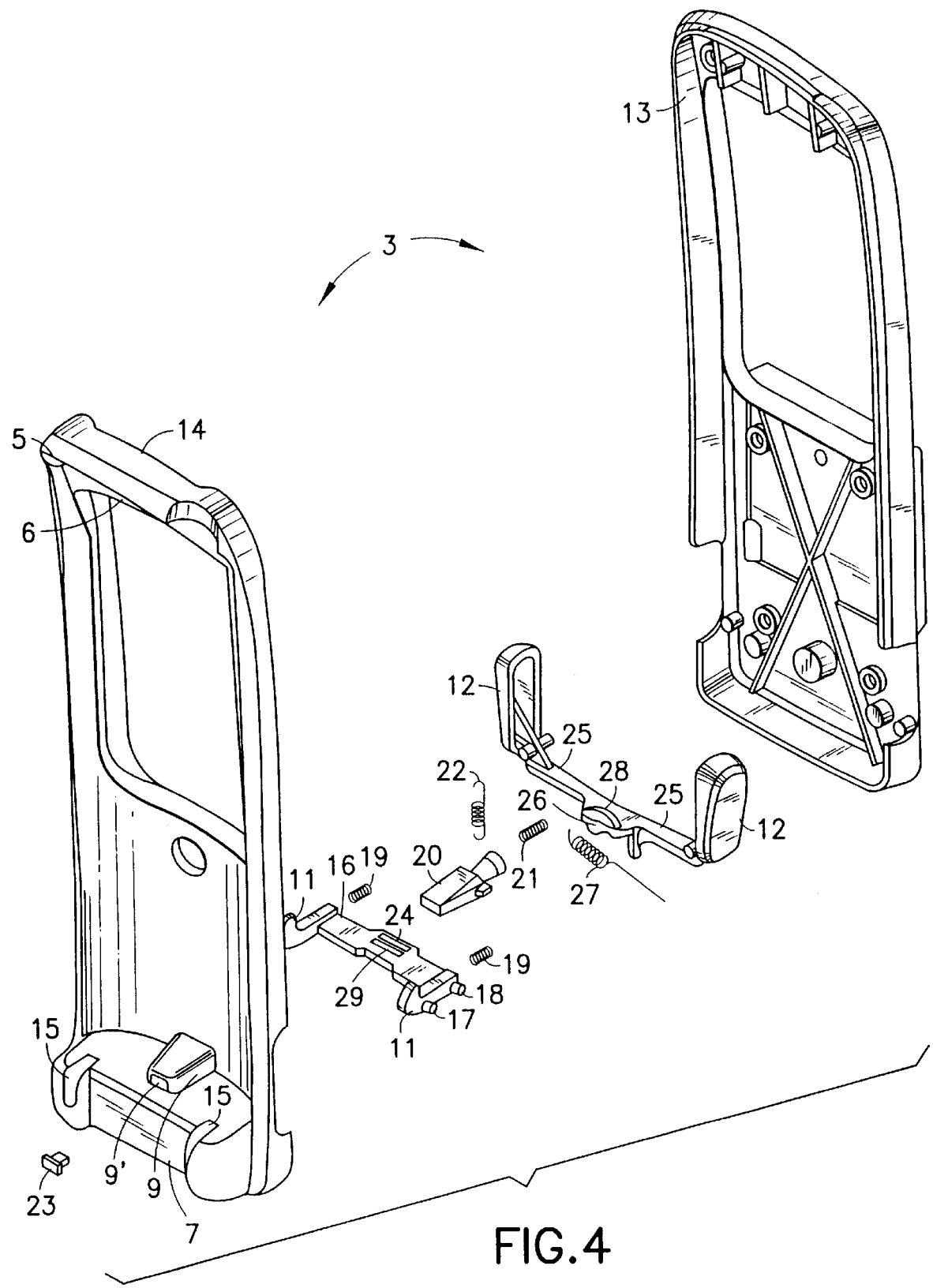
FIG. 4 is an exploded view of the bracket.
Figure 5:
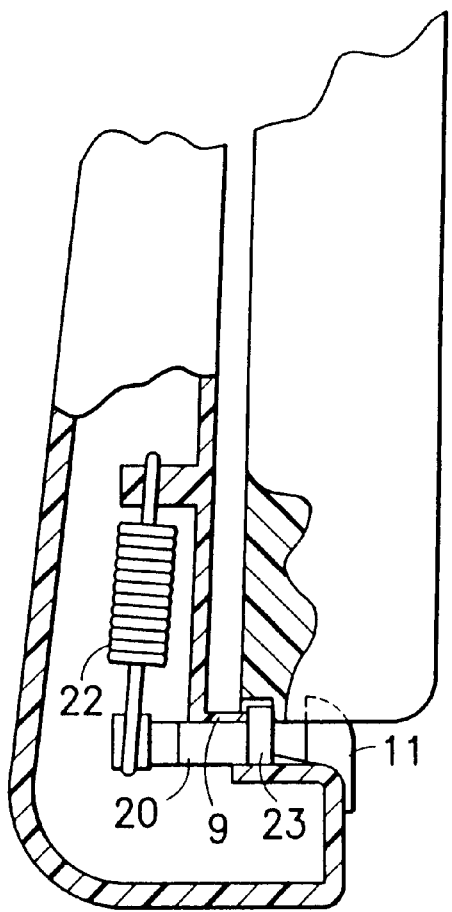
FIG. 5 illustrates a detail of the bracket and the mobile phone placed in it in the locking position.
Figure 6:
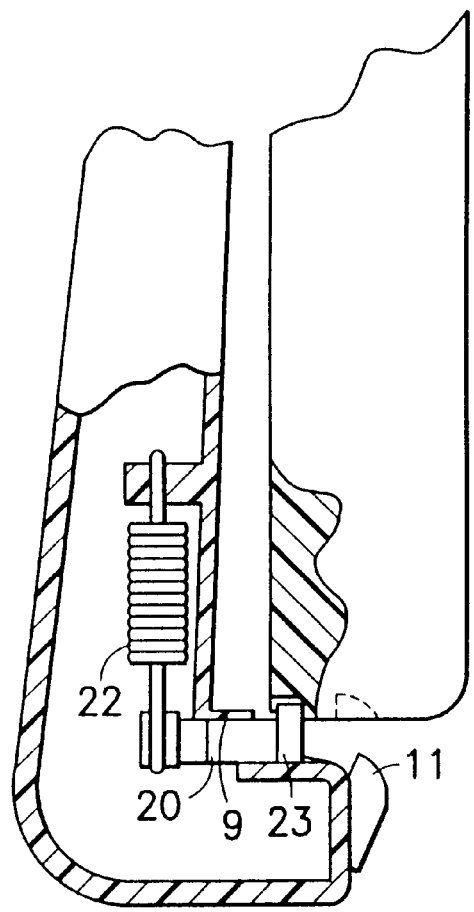
FIG. 6 illustrates a detail of FIG. 5 in the releasing position.

Mobile phone 1 according to FIG. 1 comprises a housing portion and battery 2 at its back wall. The mobile phone includes bracket 3 in which the mobile phone is placed with its back wall against the front wall of the bracket. The bracket can be attached at its back wall to, e.g., the dash board of a car.

The upper end of mobile phone 1 is provided with upper notch 4. The upper end of bracket 3 is provided with a forward protrusion 5 whose lower surface is provided with upper detent 6 with a shape similar to the notch, so that the detent sets in the notch when the mobile phone is in its place in the bracket. The notch in the application of the figures is a transverse conical groove and the detent is a ridge of a corresponding shape. The lower end of the bracket is provided with supporting lug 7 against which the lower end of the mobile phone is placed.

The lower end of the mobile phone is provided with slot hole 8 which is perpendicular to bracket 3 and which slightly diverges in the direction outwards from the mobile phone. The lower end of the bracket is provided with cam 9 with a corresponding shape, so that the cam is placed in the slot hole when the mobile phone is placed in the bracket. The front end of the cam is open and a pusher which is described below is operable in it.

The lower end of the mobile phone further comprises locking notches 10 on each side of slot hole 8, extending inwards in the vertical direction of the mobile phone. The lower end of the bracket is provided with corresponding spring-loaded locking hooks 11 for the locking notches, pressing, the mobile phone which is in its place in the bracket against upper detent 6 and cam 9 of bracket 3 without free play. Push-buttons 12 are provided on the sides of the bracket and the locking hooks are released from the locking notches of the mobile phone by pushing the push-buttons.

Bracket 3 comprises back cover 13 and front cover 14. The upper part of the bracket is provided with an opening. The covers are attached to one another by screws. The locking mechanism is inside the lower part of the bracket.

Supporting lug 7 of the lower end of the bracket is provided with notches 15 on both edges in the upper front corner and locking, hooks 11 rise from the notches into locking notches 10 of the lower end of mobile phone 1. The locking hooks protrude upwards from slide 16. Front pin 17 and back pin 19 are provided on both edges of the slide, extending laterally. The inner side walls of the lug are provided with grooves in which these pins slide. The groove comprises a horizontal portion and a lower branch extending obliquely downwards is provided at the front end of the horizontal part. The slide is pressed forward by two springs 19. When the slide is in the forward position, the front pin is at the lower end of the lower branch, so that the locking hooks are inside the lug. When the front pin is in the horizontal part of the groove, the hooks are outside the upper surface of the lug and cannot be pressed downward at this point.

Pusher 20 is provided on top of slide 16. The pusher is pushed forward by spring 21. The pusher is shaped like cam 9. An interior surface of the cam 9 forms a groove 9' that receives a portion of the pusher 20. The front end of the pusher projects through the opening on the front edge of the cam. The pusher comprises retarding spring 22 which in this case is a draw-spring. The one end of the draw-spring is attached to the pusher and the other end is attached to the front piece of bracket 3. The retarding spring presses the pusher against the roof of the cam, so that the motion of the pusher is retarded because of friction. The front end of the pusher is provided with resilient cover 23. The lower surface of the pusher is provided with a claw and the upper surface of the slide is provided with a corresponding protrusion 24. When the pusher is in its front position, the claw is slightly forward of the protrusion. When the pusher is pressed, the claw engages the protrusion and forces the slide to follow the pusher.

Push-buttons 12 comprise arms 25 directed inward against one another. The ends of the arms are opposite one another, forming hinge 26. The ends are formed so that when any one of the push-buttons is pushed, both arms turn downwards. The arms are drawn against one another into a horizontal position by spring 27. The ends of the arms form transversal pawl 28 protruding upwards. Blocking groove 29 of the slide corresponds to the pawl.

Mobile phone 1 is placed in bracket 3 so that upper notch 4 of the mobile phone is first pushed into upper detent 6 of the bracket. After this, the lower end of the mobile phone is pressed against the bracket. Thus slot hole 8 of the lower end of the mobile phone hits pusher 20 which starts to move backwards. The claw of the pusher engages slide 16 which follows the pusher, whereby locking hooks 11 rise into the locking notches of the mobile phone. When the pusher and the slide return to their back positions, blocking groove 29 of the slide hits pawl 28, whereby the mobile phone is positively locked in its place. The mobile phone is pressed, without free play, against the locking hooks and the upper detent. The mobile phone will not be released accidentally in a car collision, for example, unless the collision is so strong that the appliance is broken.

When mobile phone 1 is detached from bracket 3, push-buttons 12 are pushed so that the parts of pawl 28 turn downwards along with arms 25, releasing slide 16. Thus the slide and pusher 20 are allowed to move forward and locking hooks 11 are released from the mobile phone, descending inside supporting lug 7, and the pusher transfers the mobile phone slightly outward so that it is easy to grab. Because of retarding spring 22, the pusher and the locking hooks move in a retarded and even manner, whereby the mobile phone will not come loose from the bracket by a sudden jolt. In this way, it is not easy for the mobile phone to fall out accidentally.

The power of retarding spring 22 is naturally selected so low that it does not cause friction which would cancel the power of spring 21 of the pusher. The materials are selected so that they endure the wear-and-tear possibly caused by friction over a sufficiently long period of time.

The locking system described above is simple, reliable and easy to use. The mobile phone remains in its place in the bracket regardless of the position of the bracket. Moreover, the mobile phone is easy and convenient to detach. The described retarding and dampening system is simple, inexpensive, and reliable.

I claim:

1. A bracket for an electronic appliance, comprising a housing having a space in which the appliance can be placed, and a locking and a releasing means which can be used to attach the appliance to and release the appliance from the bracket, wherein the releasing means comprises a groove (9') in the housing, a releasing member (20) located in the groove that moves by the power of a spring when the appliance is detached, and a retarding spring (22) which presses the releasing member against the housing at the groove to slow down the movement of the releasing member on the housing.

2. A bracket according to claim 1, wherein the releasing member is a pusher (20) which can be used to push the appliance away from the bracket when releasing the appliance.

3. A bracket according to claim 1, wherein the retarding spring is a helical spring (22) whose one end is attached to the housing and the other end to the releasing member.

4. A bracket according to claim 3, wherein the retarding spring is a draw-spring (22).

5. A bracket according to claim 1, wherein the bracket is provided with a fixing clip (6) at one end and with two fixing clips (11) at an opposite end, the fixing clips engaging detents on corresponding points in the appliance placed in the bracket, holding the appliance in place in the bracket, at least one of the fixing clips comprising a spring-loaded pawl (11) that engages the detent point for the pawl in the appliance when the appliance is placed in the bracket, and which can be released when the appliance is removed from the bracket.

6. A bracket according to claim 5, wherein the fixing clips (6, 11) comprise protrusions or recesses which engage the recesses or protrusions at corresponding points on the appliance.

7. A bracket according to claim 6, wherein the fixing clips (6, 11) are provided with protrusions.

8. A bracket according to claim 7, wherein the one end of the bracket is provided with one protrusion (6) and the other end with two protrusions.

9. A bracket according to claim 1, wherein the appliance is a mobile phone.

10. A method for retarding the disengagement of an electronic appliance from a bracket comprising a housing with a space in which the appliance can be placed, and a locking and a releasing means which can be used to attach the appliance to and release the appliance from the bracket, wherein the releasing means comprises a groove in the housing, and the groove is provided with a releasing member that moves by the power of a spring when the appliance is detached, and that when the appliance is detached, the releasing member is pressed, by using the retarding spring, against the groove to slow down the movement of the releasing member.

11. A telephone holder comprising:
   a housing having a space for receiving a portion of a telephone; and
   means for releasing the telephone from the housing comprising a pusher slidably mounted to the housing for pushing against the telephone in the space in a direction for pushing the telephone out of the space, a first spring biasing the pusher in the direction towards the telephone in the space, and a second spring biasing the pusher against the housing to increase frictional resistance to movement of the pusher on the housing.

* * * * *